(12) United States Patent
Grealy

(10) Patent No.: US 9,897,711 B2
(45) Date of Patent: Feb. 20, 2018

(54) METHOD FOR DETERMINING AGGREGATE FRACTURE PROPERTIES FOR EVALUATION OF FRACTURE PROCEDURES

(71) Applicant: Microseismic, Inc., Houston, TX (US)

(72) Inventor: Michael H. Grealy, Parker, CO (US)

(73) Assignee: Microseismic, Inc., Houston, TX (US)

( * ) Notice: Subject to any disclaimer, the term of this patent is extended or adjusted under 35 U.S.C. 154(b) by 492 days.

(21) Appl. No.: 14/246,290

(22) Filed: Apr. 7, 2014

(65) Prior Publication Data

US 2015/0285933 A1 Oct. 8, 2015

(51) Int. Cl.
*G01V 1/34* (2006.01)
*G01V 1/28* (2006.01)
*G01V 1/40* (2006.01)

(52) U.S. Cl.
CPC .............. *G01V 1/345* (2013.01); *G01V 1/288* (2013.01); *G01V 1/40* (2013.01); *G01V 2210/1234* (2013.01); *G01V 2210/74* (2013.01)

(58) Field of Classification Search
CPC .......... G01V 1/345; G01V 1/288; G01V 1/40; G01V 2210/1234; G01V 2210/74
USPC ......................................................... 367/57
See application file for complete search history.

(56) References Cited

U.S. PATENT DOCUMENTS

| 8,612,156 B2* | 12/2013 | Gulati | G01V 1/28 702/11 |
| 2010/0161232 A1* | 6/2010 | Chen | G01V 1/32 702/16 |
| 2012/0160481 A1* | 6/2012 | Williams | G01V 1/50 166/250.01 |
| 2013/0081805 A1* | 4/2013 | Bradford | G01V 1/40 166/250.1 |

* cited by examiner

*Primary Examiner* — James R Hulka
*Assistant Examiner* — John T Nolan
(74) *Attorney, Agent, or Firm* — Richard A. Fagin

(57) ABSTRACT

A method for imaging microseismic events includes determining a hypocenter of microseismic events generated by at least one stage of a hydraulic fracturing procedure from recorded signals detected by seismic sensors disposed above a wellbore in the subsurface. Spatial position of the microseismic events occurring sequentially in the fracturing procedure is determined with reference to a center of fracturing procedure. Each microseismic event is assigned to one of a plurality of selected size bins defined positionally with reference to the center of the fracturing procedure. A property of each microseismic event assigned to each bin is aggregated and an image of the aggregated property is generated with respect to position referenced to the center of the fracturing procedure.

4 Claims, 5 Drawing Sheets

METHOD FOR DETERMINING AGGREGATE FRACTURE PROPERTIES FOR EVALUATION OF FRACTURE PROCEDURES

CROSS-REFERENCE TO RELATED APPLICATIONS

Not Applicable.

STATEMENT REGARDING FEDERALLY SPONSORED RESEARCH OR DEVELOPMENT

Not applicable.

BACKGROUND

This disclosure is related to the field of passive seismic monitoring of hydraulic fracturing of subsurface formations. More specifically, the disclosure is related to determining aggregate properties of a fracture treatment to assist a well operator in planning further fracture treatments and/or locations of additional wellbores within a subsurface formation.

Hydraulic fracturing of subsurface formations is known in the art for increasing the effective wellbore radius in a subsurface formation. Such effect may provide the benefits of providing a permeable path through portions of the formation proximate a well drilled therethrough (called "skin damage") so as to increase the productivity of such wells. Hydraulic fracturing is also known to be used to create permeable interconnections between naturally occurring fractures in subsurface formations so that a well traversing such formations may cumulatively produce enough hydrocarbons so as to be economically viable. Most hydraulic fracturing techniques known in the art include pumping a fluid with suspended solid particles (proppant) into a wellbore that is in hydraulic communication with a formation of interest. Pressure of the carrying fluid is set so as to exceed the fracture pressure of the formation of interest. Once the proppant is emplaced where desired in the formation, the carrying fluid may change its rheological properties, e.g., a gel type fracturing fluid may revert to the properties of plain water, and thus be more amenable to removal from the formation ("clean up").

It is known in the art to use passive seismic sensing to determine the hypocenters (time and position of origin) of fracture events created by hydraulic fracturing. Such determination may be performed during a fracturing procedure to determine spatial distribution of the hydraulic fractures thus created. One such technique is described in U.S. Pat. No. 7,663,970 issued to Duncan et al.

DETAILED DESCRIPTION

Figure 1:
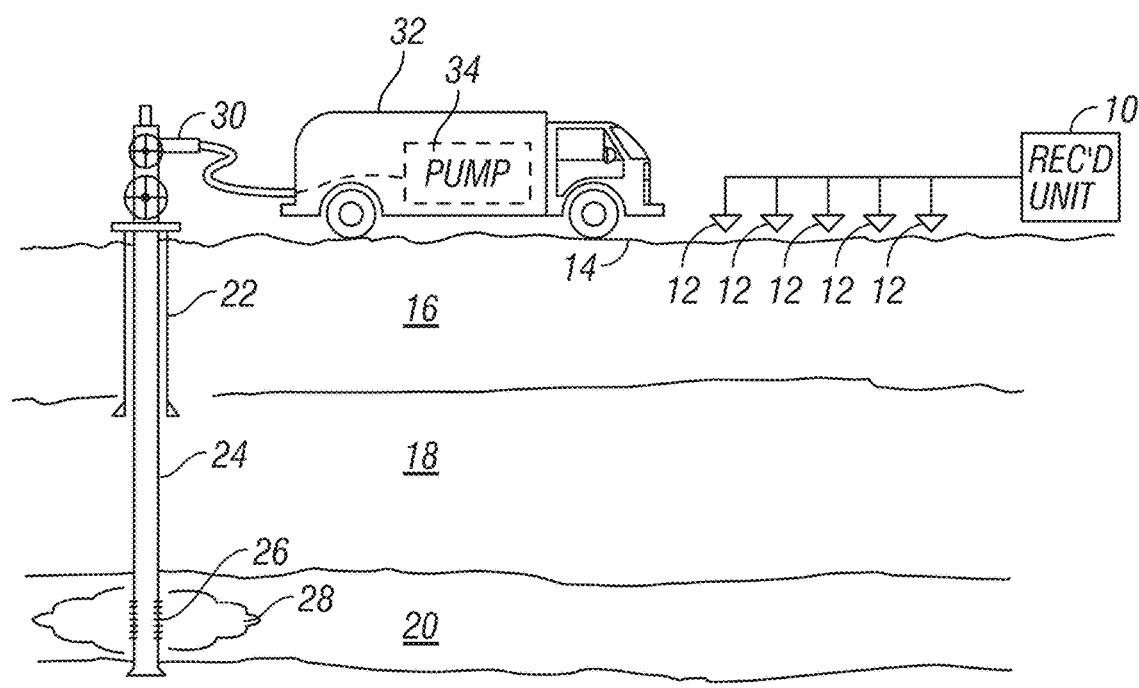
FIG. 1 shows an example of acquiring seismic signals to determine hypocenters of seismic events resulting from hydraulic fracturing operations.

FIG. 1 shows an example arrangement of seismic sensors as they would be used in one application of a method according to the present disclosure. In FIG. 1, each of a plurality of seismic sensors, shown generally at 12, is deployed at a selected position proximate the Earth's surface 14. In marine applications, the seismic sensors would typically be deployed on the water bottom in a device known as an "ocean bottom cable." In still other applications the seismic sensors may be placed in one or more wellbores drilled through the subsurface formations. The seismic sensors 12 in the present embodiment may be geophones, but may also be accelerometers or any other sensing device known in the art that is responsive to velocity, acceleration or motion of the particles of the Earth proximate the sensor. The seismic sensors 12 generate electrical or optical signals in response to the particle motion or acceleration, and such signals are ultimately coupled to a recording unit 10 for making a time-indexed recording of the signals from each sensor 12 for later interpretation by a method according to the invention. In other implementations, the seismic sensors 12 may be disposed at various positions within a wellbore drilled through the subsurface formations. A particular advantage of the method of the invention is that it provides generally useful results when the seismic sensors are disposed at or near the Earth's surface. Surface deployment of seismic sensors is relatively cost and time effective as contrasted with subsurface sensor emplacements typically needed in methods known in the art prior to the present invention.

In some embodiments, the seismic sensors 12 may be arranged in sub-groups having spacing therebetween less than about one-half the expected wavelength of seismic energy from the Earth's subsurface that is intended to be detected. Signals from all the sensors in one or more of the sub-groups may be added or summed to reduce the effects of noise in the detected signals.

In other embodiments, the seismic sensors 12 may be placed in a wellbore, either permanently for certain long-term monitoring applications, or temporarily, such as by wireline conveyance, tubing conveyance or any other sensor conveyance technique known in the art.

A wellbore 22 is shown drilled through various subsurface Earth formations 16, 18, through a hydrocarbon producing formation 20. A wellbore tubing 24 having perforations 26 formed therein corresponding to the depth of the hydrocarbon producing formation 20 is connected to a valve set known as a wellhead 30 disposed at the Earth's surface. The wellhead may be hydraulically connected to a pump 34 in a frac pumping unit 32. The frac pumping unit 32 is used in the process of pumping a fluid, which in some instances includes selected size solid particles, collectively called "proppant", are disposed. Pumping such fluid, whether propped or otherwise, is known as hydraulic fracturing. The movement of the fluid is shown schematically at the fluid front 28 in FIG. 1. In hydraulic fracturing techniques known in the art, the fluid is pumped at a pressure which exceeds the fracture pressure of the particular producing formation 20, causing it to rupture, and form fissures therein. The fracture pressure is generally related to the pressure exerted by the weight of all the formations 16, 18 disposed above the hydrocarbon producing formation 20, and such pressure is generally referred to as the "overburden pressure." In propped fracturing operations, the particles of the proppant move into such fissures and remain therein after the fluid pressure is reduced below the fracture pressure of the formation 20. The proppant, by appropriate selection of particle size distribution and shape, forms a high permeability channel in the formation 20 that may extend a great lateral distance away from the tubing 24, and such channel remains permeable after the fluid pressure is relieved. The effect of the proppant filled channel is to increase the effective radius of the wellbore 24 that is in hydraulic communication with the producing formation 20, thus substantially increasing productive capacity of the wellbore 24 to hydrocarbons.

The fracturing of the formation 20 by the fluid pressure creates seismic energy that is detected by the seismic sensors 12. The time at which the seismic energy is detected by each of the sensors 12 with respect to the time-dependent position in the subsurface of the formation fracture caused at the fluid front 28 is related to the acoustic velocity of each of the formations 16, 18, 20, and the position of each of the seismic sensors 12.

Having explained one type of passive seismic data that may be used, an example method for analyzing results from such seismic data will now be explained. First, the hypocenters (time of occurrence and spatial position of occurrence of each seismic event) may be determined from the recorded signals. One non-limiting example of a technique for determining event hypocenters is described, for example, in U.S. Pat. No. 7,663,970 issued to Duncan et al.

Figure 2:
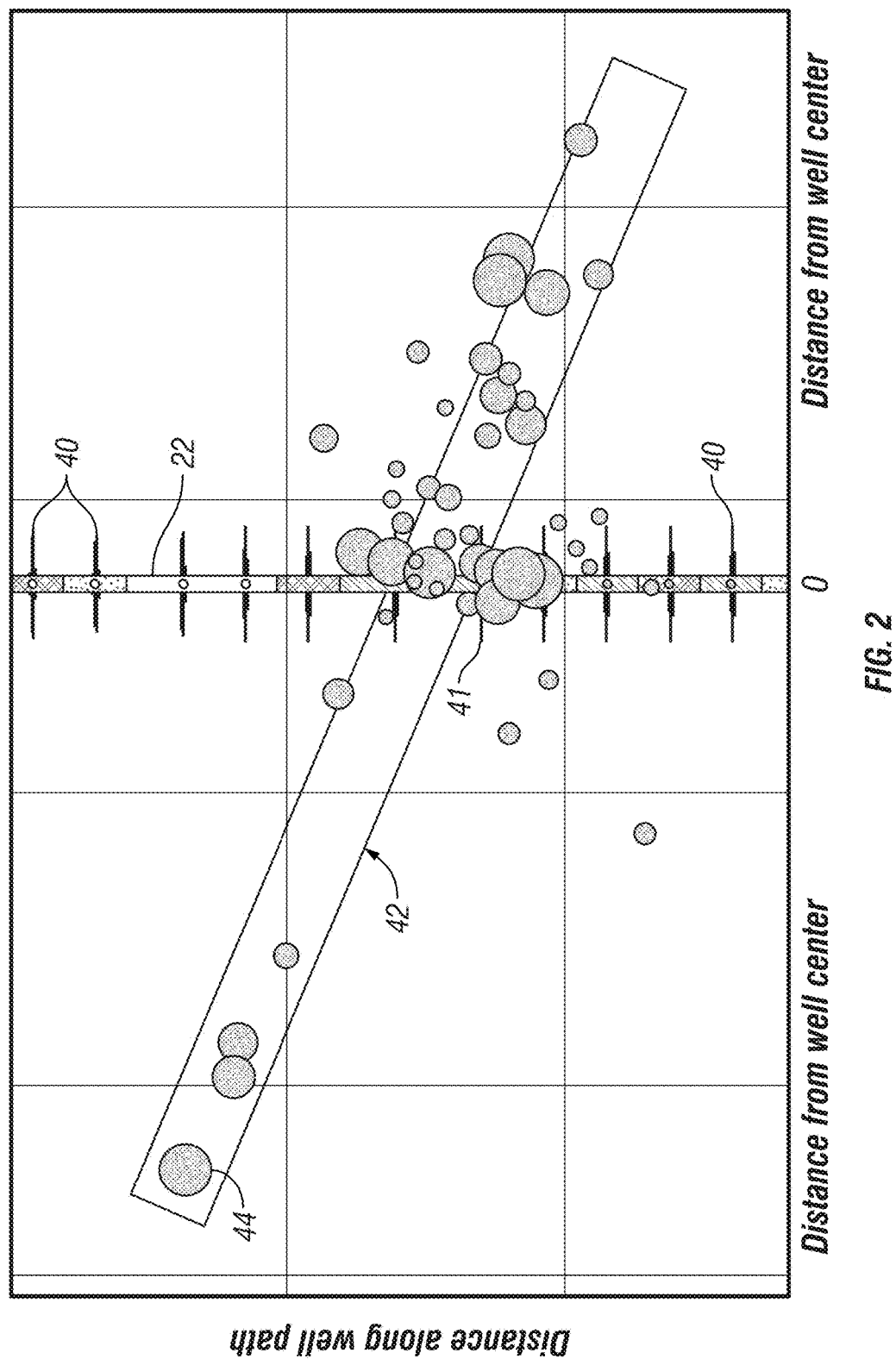
FIG. 2 shows a highly inclined section of a wellbore as in FIG. 1 with determined positions of microseismic events plotted as circles and a direction "trend" of the positions of the microseismic events determined and plotted.

Referring to FIG. 2, the wellbore 22 is shown in plan view for a portion thereof that is highly inclined or even horizontal. It is known in the art to directionally drill wellbores that are initially substantially vertical as shown in FIG. 1 to a selected depth above the depth of a target subsurface formation, and then directionally drill the wellbore so that its trajectory substantially corresponds to the dip of the target formation. Such directionally drilled section of the wellbore 22 may extend for a kilometer or more from the geodetic position of the wellbore at the Earth's surface. FIG. 2 also shows a plurality of longitudinally spaced apart perforation zones 40. Each of the perforation zones 40 may have openings in the wellbore pipe 24 as described with reference to FIG. 1, and may be an initiation point for one or more "stages" of fracture treating the wellbore as explained with reference to FIG. 1. The foregoing operation may be performed for individual perforation zones 40 by hydraulically isolating the other perforation zones, or two or more perforation zones 40 maybe fracture treated as explained above substantially simultaneously. In the example shown in FIG. 2, one of the perforation zones 41 is fracture treated individually, and detection and recording of seismic signals may be performed as explained with reference to FIG. 1.

In FIG. 2, hypocenters of each microseismic event identified, e.g., as described in the Duncan et al. patent referenced above, may be plotted as shown in FIG. 2 with suitable symbols, e.g., circles 44. A magnitude related quantity, e.g., amplitude or moment determined for each identified microseismic event may be represented, e.g., by the size of the symbol or any other suitable representation. The foregoing procedure may be repeated for each "stage" of the fracture treatment, i.e., for each perforation zone 40 through which fracture fluid is pumped, and the seismic energy detected as explained with reference to FIG. 1. Because the hypocenters define both a spatial position and a time of occurrence, by setting boundaries on the time of occurrence of each microseismic event as the starting time and ending time of each fracturing stage, the identified microseismic events may be grouped or identified with the fracturing stage in which they occurred. The result is a series of smaller event sets that belong, temporally, to each of a plurality of fracturing stages. The circles 44 in FIG. 2 represent the frac stage originating at perforation zone 41.

A process for characterizing fracture treatment according to the present disclosure may begin by translating all of the events in a single frac stage to a datum that represents the stage center (i.e., the wellbore at the position of the perforation zone 41). This may be performed by subtracting the stage center location spatial coordinates from each determined microseismic event hypocenter spatial coordinates. The spatial coordinates of the frac stage center may be determined by using well known borehole directional survey techniques known in the art. The stage center may be defined by its Cartesian coordinates as X, Y, and Z. The position of each microseismic event may thus be defined by differences in three dimensions dX, dY, and dZ from the frac stage center.

The events detected in each stage may further be described by an apparent azimuth of the apparent fracture propagation direction (event trends) formed by the detected microseismic event hypocenters. The azimuth of the event trends can either be observed and recorded, or may be calculated. An example azimuth of microseismic events is shown at 42 in FIG. 2. In one example, the azimuth may be calculated from the locations of the microseismic events wherein events used to calculate the azimuth may be limited by a requirement that dX, dY and/or dZ must increase and the increased distance(s) must correspond to microseismic events that are successively later in time. The azimuth may be calculated, for example, by determining a best fit line through the event locations.

After the microseismic event hypocenters have been translated to stage-local coordinates and the azimuth of the trends have been determined, the events within each stage may be rotated about the stage-local origin. The final orientation of the rotated events can vary, but for the purpose of the present description, the events within each trend may be rotated until the trends are coincident with a selected axis (e.g., the X axis) in the stage-local coordinate system. Event trend rotation may be performed to better facilitate stacking of the detected events between subsequent stages. The rotation may be performed using a standard rotation matrix.

With all of the events within each stage having been translated and rotated, the area described by the local coordinate system may be divided into discrete sub volumes or "bins." Bin size is a matter of discretion for the user, but may be guided by positional uncertainty calculations, original bin size for determining the hypocenters of the events or any other user defined criterion.

The foregoing procedure may be performed for each stage of the fracture treatment. After each fracture stage has its microseismic events identified and associated trends identified and rotated, all of the identified microseismic events, regardless of stage in which they occur, may be aggregated into a single set of bins defined with reference to the local coordinate system. After the bins have been defined, in this case as 75'×75' cells, the determined microseismic events and their associated imaging attributes (e.g., amplitude or moment) are placed into the bin associated with the hypocenter location of each microseismic event. Again, this may be performed with all of the discretely imaged events regardless of stage association.

Defining the content of each bin may be performed using any one or more of a plurality of user defined aggregate functions including event count, sum of energy (moment), average energy, etc. The aggregation type may be user defined as explained above. Ultimately the type of aggregation will also define what type of conclusions can be drawn from the final analysis of the product. For example, event count within each of the bins may provide a view of the event distribution referenced to stage center, while cumulative or summed moment with a bin may be better suited to identifying where the majority of the energy is released as a result of the fracturing.

Figure 3:
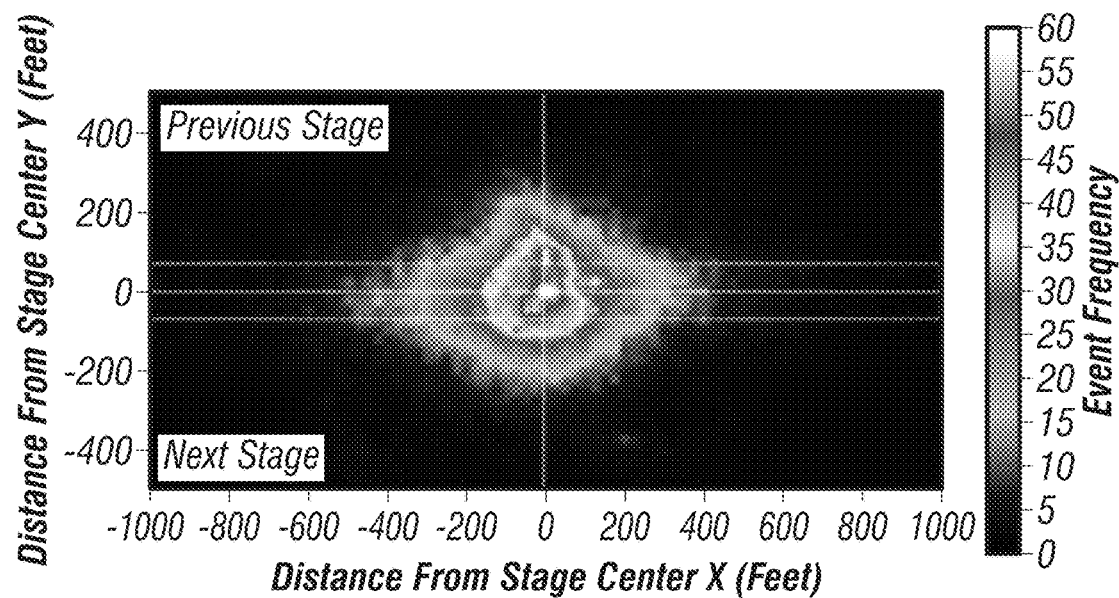
FIG. 3 shows an example aggregate plot of frequency of occurrence of microseismic events with respect to position from the wellbore center in plan view (in the X-Y plane for a horizontal or highly inclined wellbore.
Figure 4:
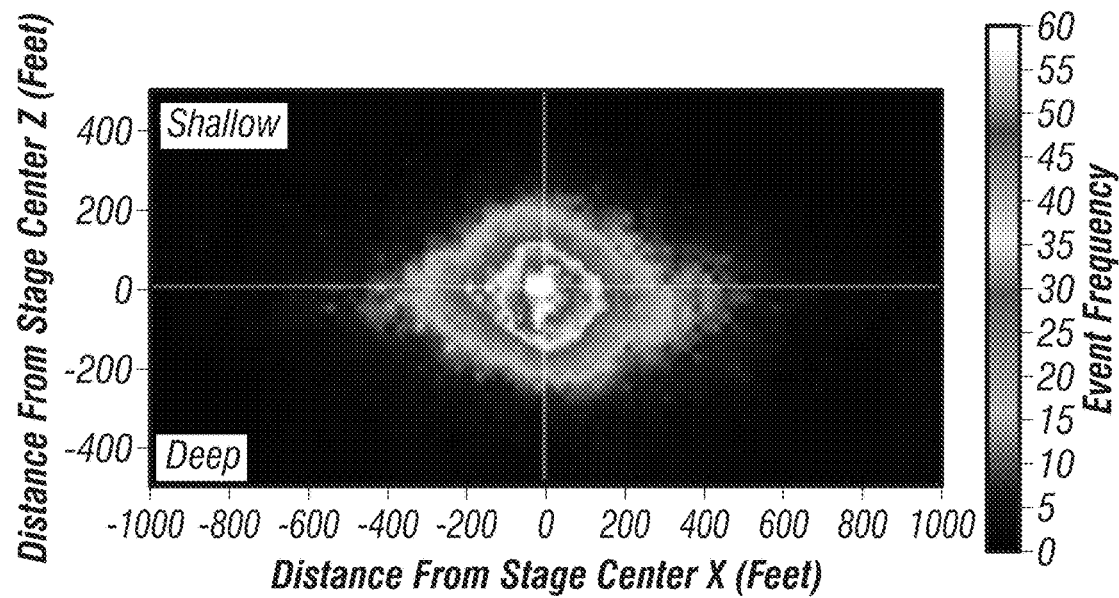
FIG. 4 shows an aggregate plot as in FIG. 3 with the display in the X-Z plane, i.e., in a vertical plane transverse to the direction of the wellbore.

After the microseismic events have been assigned to bins as explained above, the aggregated event information in each bin may be presented as an image using a number of commercially available gridding, interpolating, and mapping software programs. The resulting image(s) may be used, for example in assisting determining suitable well spacing in the horizontal and vertical planes, and stage spacing along each wellbore. FIG. 3 shows an example of a plot in the X-Y plane of microseismic events binned as explained herein. FIG. 4 shows an example of a plot in the X-Z plane of microseismic events binned as explained herein. What is observable in FIGS. 3 and 4 is that while microseismic events may occur at relatively large distances from the wellbore (stage centers), most of the microseismic events may occur within a much smaller distance from the wellbore. Thus, the plots of FIG. 3 and FIG. 4 may indicate that subsequent wellbores may be drilled more closely spaced to the wellbore being analyzed without substantially increasing the risk of interference between wellbores. Similar analysis may be made with reference to distance between stages along each wellbore.

It is also possible to extend the foregoing procedure to generate aggregated event parameter displays in three dimensions (3D) or four dimensions (4D). A 4D parameter display is understood by those skilled in the art as a display which shows the parameters in the three orthogonal spatial dimensions, and time as the fourth dimension. Similarly, aggregated event parameter displays in a plane (2D) may be presented with respect to time as another form of 3D display.

The number of dimensions in the aggregated parameter display will be related to the number of dimensions assign to the previously described bins. For example, to generate a spatial 3D display bins may be specified as having three orthogonal length parameters (e.g., 75'×75'×75' for 3D instead of just 75'×75' for 2D). Similarly, one may specify a time dimension to the bins (e.g., 75'×75'×75'×5 minutes or (X, Y, Z, Time)). Any combination of the foregoing dimensions may be used within the scope of the present disclosure (e.g., (X, Y, Time), (X, Y, Z), (X, Z, Time), (X, Y, Z, Time), etc.). To stack the events in time and space across different fracture treatment stages, one must also translate the time to be stage relative. In other words, subtract out the absolute start time for each fracture stage from the hypocenters assigned to each stage and then the data can be binned in relative stage time.

Figure 5:
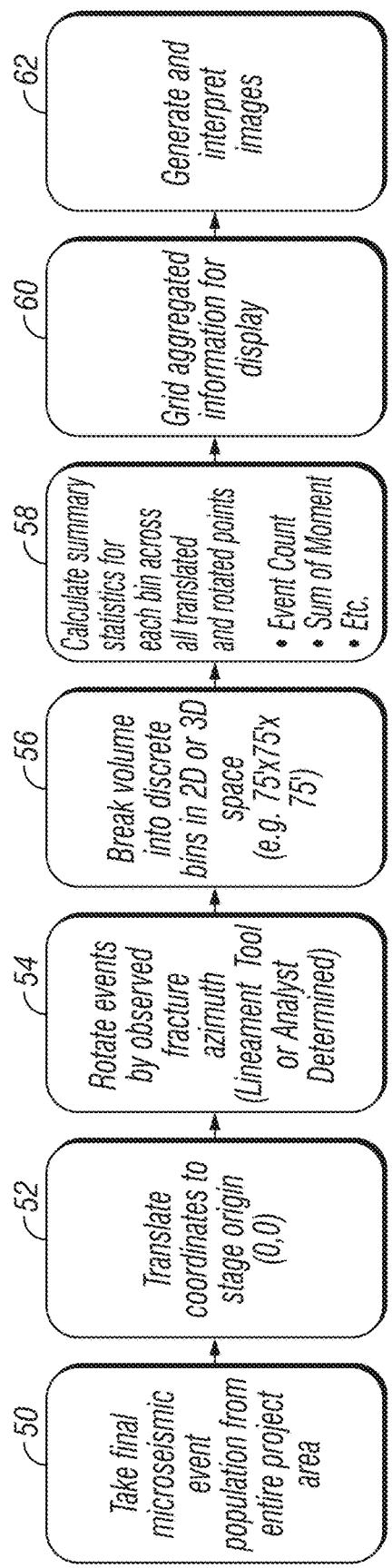
FIG. 5 shows a flow chart of processing microseismic events according to the present disclosure.

FIG. 5 shows a flow chart of a process according to the present disclosure. At 50, each stage of the fracturing procedure has hypocenters of microseismic events determined. At 52, the spatial coordinates of each determined microseismic event may be referenced to the coordinates of the stage center (which may be defined for each stage as the origin 0,0,0). At 54, trends for each stage are identified, and the trends are rotated so that they are all disposed in a common planar orientation. At 56, the subsurface volume along the well trajectory may be discretized into selected size bins. At 58, the identified, position rotated microseismic events are assigned to the one of the bins in which its rotated spatial position corresponds. At 60, one or more characteristics of the microseismic events assigned to each bin are aggregated. As explained above, the characteristics may include, without limitation, event count, moment, and energy released. Finally, at 60, an image may be generated in one or more planes, e.g., as shown with reference to FIGS. 3 and 4.

The images generated may be used to determine, e.g., wellbore spacing in the vertical and/or horizontal planes, and frac stage spacing, among other parameters.

Figure 6:
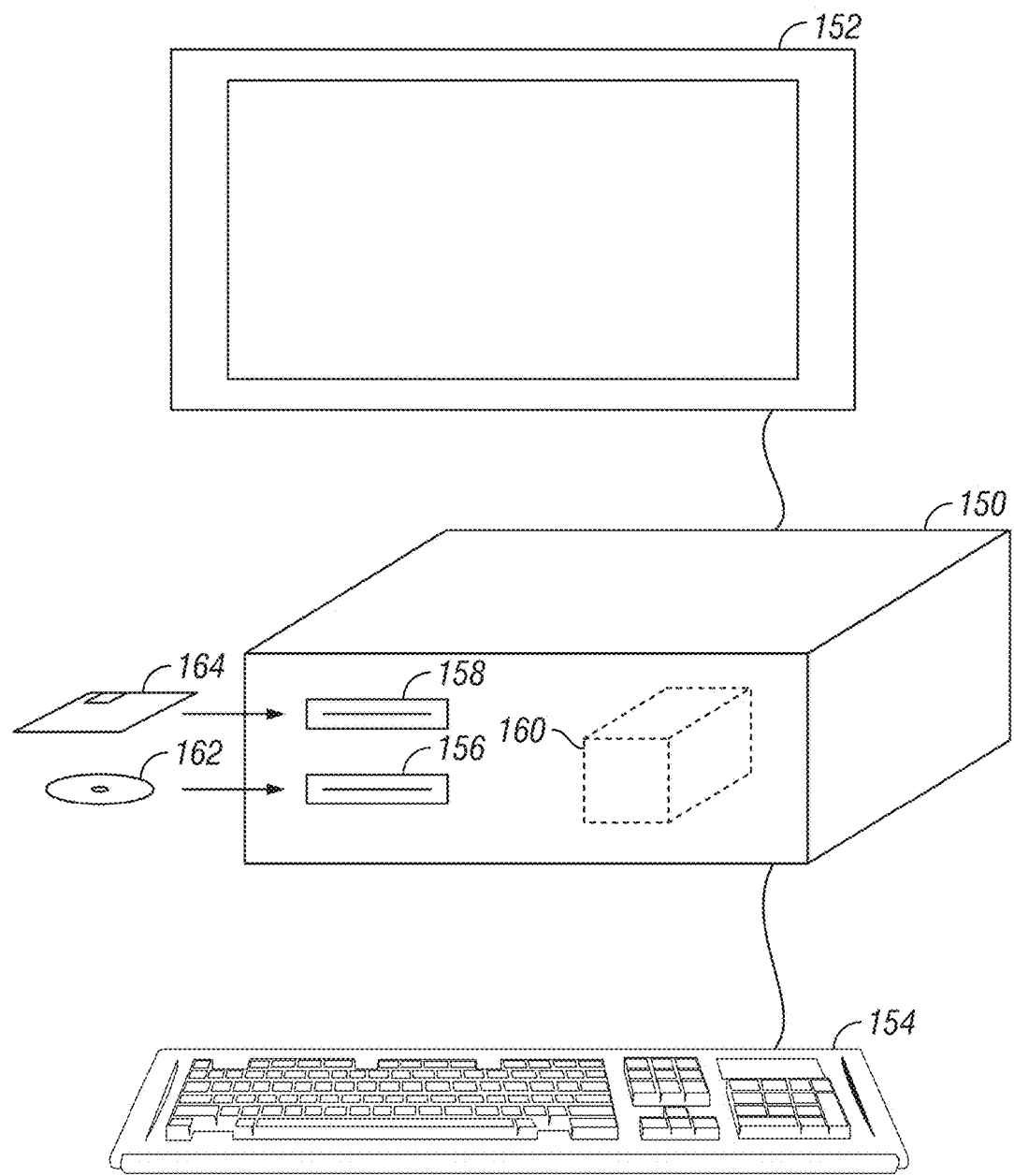
FIG. 6 shows an example computer that may be used to perform processing according to the various aspects of the present disclosure.

Referring to FIG. 6, the foregoing process as explained with reference to FIGS. 1-5, can be embodied in computer-readable code. The code can be stored on a computer readable medium, such as solid state memory card 164, CD-ROM 162 or a magnetic (or other type) hard drive 166 forming part of a general purpose programmable computer. The computer, as known in the art, includes a central processing unit 150, a user input device such as a keyboard 154 and a user display 152 such as a flat panel LCD display or cathode ray tube display. According to this aspect of the invention, the computer readable medium includes logic operable to cause the computer to execute acts as set forth above and explained with respect to the previous figures. The computer, as explained above, may be in the recording unit (10 in FIG. 1) or may be any other computer located at any desired location.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for imaging microseismic events, comprising:
in a computer, determining a hypocenter of microseismic events generated by at least one stage of a hydraulic fracturing procedure from recorded signals detected by seismic sensors disposed above a wellbore in the subsurface;
in the computer, determining spatial position of the microseismic events occurring sequentially in the fracturing procedure with reference to a center of fracturing procedure;
in the computer, assigning each microseismic event to one of a plurality of equal, selected size bins defined positionally with reference to the center of the fracturing procedure;
in the computer aggregating seismic moment of each microseismic event assigned to each bin; and
in the computer generating an image of the aggregated seismic moment with respect to position referenced to the center of the fracturing procedure.

2. The method of claim 1 further comprising determining at least one of a well spacing and a fracture stage spacing using the image.

3. The method of claim 1 wherein the image is displayed in a vertical plane transverse to a trajectory of the wellbore.

4. The method of claim 1 wherein the image is displayed in a horizontal plane.

* * * * *